US009008510B1

(12) United States Patent
Zhao et al.

(10) Patent No.: US 9,008,510 B1
(45) Date of Patent: Apr. 14, 2015

(54) IMPLEMENTATION OF A LARGE-SCALE MULTI-STAGE NON-BLOCKING OPTICAL CIRCUIT SWITCH

(71) Applicant: Google Inc., Mountain View, CA (US)

(72) Inventors: Xiaoxue Zhao, Fremont, CA (US); Amin Vahdat, Los Altos, CA (US); Hong Liu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/157,964

(22) Filed: Jan. 17, 2014

Related U.S. Application Data

(62) Division of application No. 13/106,384, filed on May 12, 2011, now abandoned.

(51) Int. Cl.
| | |
|---|---|
| *H04J 14/00* | (2006.01) |
| *H04B 10/08* | (2006.01) |
| *H04J 3/14* | (2006.01) |
| *H04Q 11/00* | (2006.01) |
| *H04L 12/933* | (2013.01) |

(52) U.S. Cl.
CPC ........ *H04Q 11/0005* (2013.01); *H04L 49/1515* (2013.01)

(58) Field of Classification Search
CPC .................. H04Q 2011/0052; H04Q 11/0005; H04Q 11/0001; H04J 14/0212; H04L 49/00; H04L 49/15; H04L 49/10; H04L 49/1515; H04L 45/00; H04L 45/48; H04L 49/351; H04L 49/25; H04B 10/27
USPC ............................. 398/45–57, 17–24, 25–38; 370/241–253
See application file for complete search history.

(56) References Cited

U.S. PATENT DOCUMENTS

| | | | |
|---|---|---|---|
| 3,582,560 A * | 6/1971 | Banks et al. ................. | 340/2.22 |
| 5,077,483 A | 12/1991 | Cloonan et al. | |
| 5,436,886 A | 7/1995 | McGill | |
| 5,521,591 A * | 5/1996 | Arora et al. .................. | 340/2.21 |
| 6,139,196 A * | 10/2000 | Feth et al. ....................... | 385/97 |
| 6,335,992 B1 | 1/2002 | Bala et al. | |
| 6,363,182 B2 * | 3/2002 | Mills et al. ...................... | 385/17 |

(Continued)

OTHER PUBLICATIONS

"Calient Technologies: The Leader in Proven 3D MEMS Technology" [online]. [Retrieved Feb. 1, 2011] [Retrieved from the Internet: <http://www.calient.net/>, 1 page.

(Continued)

*Primary Examiner* — Ken Vanderpuye
*Assistant Examiner* — Dibson Sanchez
(74) *Attorney, Agent, or Firm* — Lerner, David, Littenberg, Krumholz & Mentlik, LLP

(57) ABSTRACT

Embodiments provide a methodology for designing a large-scale non-blocking OCS using a multi-stage folded CLOS switch architecture for use in datacenter networks and fiber-rich backbone network POPs. One aspect employs a folded CLOS architecture because of its ease of implementation, enabling the topology to scale arbitrarily with increasing number of stages. The fraction of ports allocated for internal switch wiring (overhead) also increases with the number of stages. Design decisions are made to carefully optimize the insertion loss per module, number of ports per module, number of stages and the total scale required. Other embodiments include folded CLOS switch architectures having at least two stages. In one example, power monitoring may be included only on the leaf switches.

11 Claims, 8 Drawing Sheets

(56) References Cited

U.S. PATENT DOCUMENTS

| | | | |
|---|---|---|---|
| 6,453,083 B1* | 9/2002 | Husain et al. | 385/17 |
| 6,486,983 B1 | 11/2002 | Beshai et al. | |
| 6,606,427 B1 | 8/2003 | Graves et al. | |
| 6,696,917 B1 | 2/2004 | Heitner et al. | |
| 6,882,766 B1* | 4/2005 | Corbalis et al. | 385/16 |
| 6,940,308 B2* | 9/2005 | Wong | 326/41 |
| 7,389,046 B1 | 6/2008 | Tanaka et al. | |
| 7,864,792 B2 | 1/2011 | Scott et al. | |
| 8,000,336 B2 | 8/2011 | Harel | |
| 8,175,107 B1* | 5/2012 | Yalagandula et al. | 370/408 |
| 8,396,067 B2* | 3/2013 | Miyoshi et al. | 370/392 |
| 8,489,718 B1* | 7/2013 | Brar et al. | 709/222 |
| 8,495,194 B1* | 7/2013 | Brar et al. | 709/223 |
| 8,570,865 B2* | 10/2013 | Goldenberg et al. | 370/230 |
| 2003/0210870 A1 | 11/2003 | Graves | |
| 2004/0101233 A1* | 5/2004 | Lee et al. | 385/16 |
| 2005/0002601 A1 | 1/2005 | Lin et al. | |
| 2005/0111433 A1* | 5/2005 | Stewart | 370/351 |
| 2006/0222289 A1* | 10/2006 | Takita et al. | 385/17 |
| 2007/0196107 A1* | 8/2007 | Takita | 398/45 |
| 2009/0016332 A1* | 1/2009 | Aoki et al. | 370/388 |
| 2010/0020806 A1 | 1/2010 | Vahdat et al. | |
| 2010/0254703 A1* | 10/2010 | Kirkpatrick et al. | 398/45 |
| 2010/0254730 A1* | 10/2010 | Centofante et al. | 399/260 |
| 2010/0265849 A1* | 10/2010 | Harel | 370/256 |
| 2010/0306408 A1 | 12/2010 | Greenberg et al. | |
| 2011/0280572 A1* | 11/2011 | Vobbilisetty et al. | 398/45 |
| 2011/0302346 A1* | 12/2011 | Vahdat et al. | 710/301 |
| 2012/0039161 A1* | 2/2012 | Allan et al. | 370/216 |
| 2012/0072602 A1 | 3/2012 | Marr et al. | |
| 2012/0072614 A1 | 3/2012 | Marr et al. | |
| 2012/0250574 A1 | 10/2012 | Marr | |
| 2012/0250679 A1 | 10/2012 | Judge et al. | |
| 2012/0300669 A1* | 11/2012 | Zahavi | 370/254 |
| 2013/0039169 A1* | 2/2013 | Schlansker et al. | 370/225 |
| 2013/0083701 A1* | 4/2013 | Tomic et al. | 370/255 |

OTHER PUBLICATIONS

"Crossfiber: Breakthrough Optical Switch Modules" [online]. [Retrieved Feb. 1, 2011] Retrieved from the internet: <http://www.crossfiber.com/products/index.html>, 1 page.

"Crossfiber: Breakthrough Optical Switch Modules" [online]. [Retrieved Feb. 1, 2011] Retrieved from the internet: <http://www.crossfiber.com>, 1 page.

"FiberZone Networks" [online]. [Retrieved Feb. 1, 2011] Retrieved from the internet: <http://www.fiberzone-networks.com>, 1 page.

"Glimmerglass", [online]. [Retrieved Feb. 1, 2011] Retrieved from the internet: <http://www.glimmerglass.com/?gclid>, 1 page.

"Polatis" [online]. [Retrieved Feb. 1, 2011] Retrieved from the internet: <http://www.polatis.com>, 3 pages.

A. Olkhovets, P. Phanaphat, C. Nuzman, D.J.Shin, C. Lichtenwalner, M. Kozhevnikov, and J. Kim, Performance of an Optical Switch Based on 3-D MEMS Crossconnect, 2004, 3 pages.

Andres Fernandez, Bryan P. Staker, Windsor E. Owens, Lawrence P. Muray, James P. Spallas, William C. Banyai, Modular MEMS Design and Fabrication for an 80+80 Transparent Optical Cross-Connect Switch, Oct. 25, 2004, 10 pages.

Charles Clos, a Study of Non-Blocking Switching Networks, Oct. 30, 1952, 19 pages.

Duthie et al., Optical Technologies, Systems and Networks Design of Broadband Networks Using Electro-Optic Switching Technology, 1988, Digital Technology-Spanning the Universe, Conference Record, IEEE International Conference, pp. 1-5.

Emily Carr, Ping Zhang, Doug Keebaugh, Kelvin Chau, Cost-Effective Method of Manufacturing a 3D MEMS Optical Switch, 2009, 8 pages.

Giacomazzi et al., A Study of Non Bloclung Multicase Switching Networks Feb. 1995, IEEE Transactions on Communications, vol. 43, No. 2/3/4, pp. 1163-1168.

John Kim, William J. Dally, Dennis Abts, Adaptive Routing in High-Radix Clos Network, Nov. 2006, 11 pages.

John Kim, William J. Dally, Dennis Abts, Flattened Butterfly: A Cost-Efficient Topology for High-Radix Networks, 2007, 12 pages.

Patrick B. Chu, Shi-Sheng Lee, and Sangtae Park, MEMS: The Path to Large Optical Crossconnects, 2002, 8 pages.

Sterling Perrin, The Need for Next-Generation ROADM Networks, Sep. 2010, 15 pages.

Steve Scott, Dennis Abts, John Kim, William J. Dally, The Black Widow High-Radix Clos Network, 2006, 12 pages.

Tsuyoshi Yamamoto, Johji Yamaguchi, Nobuyuki Takeuchi, Akira Shimizu, Eiji Higurashi, Renshi Sawada and Yuji Uenishi, A Three-Dimensional MEMS Optical Switching Module Having 100 Input and 100 Output Ports, 2003, 3 pages.

* cited by examiner

IMPLEMENTATION OF A LARGE-SCALE MULTI-STAGE NON-BLOCKING OPTICAL CIRCUIT SWITCH

CROSS-REFERENCE TO RELATED APPLICATIONS

The present application is a divisional of U.S. patent application Ser. No. 13/106,384, filed on May 12, 2011, the disclosure of which is hereby incorporated herein by reference.

BACKGROUND OF THE INVENTION

1. Field of the Invention

The present invention is generally related to optical interconnect and transport systems. More particularly, aspects of the invention are directed to non-blocking optical circuit switching modules.

2. Description of Related Art

Cloud computing and its applications are effecting a qualitative shift in the way people communicate and share information. The underlying computer networks that support cloud computing can be divided into two major categories: intra-datacenter and inter-datacenter. An intra-datacenter network interconnects the computing infrastructure (e.g., servers, disks) within the same building or among different buildings of a datacenter campus. An inter-datacenter network employ connections from metropolitan to long-haul reach interconnecting multiple datacenters distributed at different geographic locations. Many, if not most modern high-speed data links use optical transmission technologies via optical fibers for both intra- and inter-datacenter networks.

Currently, most of the actual computing and storage underlying the Internet and cloud computing takes place in warehouse-scale data center buildings. Similarly, most of the long-haul links transferring data and requests back and forth between end users and data centers are switched through Internet points of presence ("POP"). Both environments transfer a tremendous amount of data between individual computers and the switches and routers responsible for getting the data to its destination. This bisection bandwidth is often measured in the hundreds of terabits/second in individual data centers and POPs and is expected to soon surpass the petabit/second mark. Managing this fiber interconnect can be a significant challenge from a planning and deployment perspective. Furthermore, re-fibering an existing deployment, for instance to expand capacity, is a very labor-intensive process that can be mistake-prone. Consider, for instance, the challenges of physically rewiring a fiber plant consisting of multiple tons of short (e.g., less than 300 m) optical fiber patch cords measuring hundreds of miles in total length. Given this daunting task, re-fibering may not even be attempted in many situations.

Fiber infrastructure is typically deployed, organized and interconnected using passive fiber patch panels. These patch panels are made of arrays of passive fiber mating connectors. Therefore, network topologies are often built in a manual and static fashion. Often, there is neither active power monitoring for fault detection nor troubleshooting, nor is there a capability to automatically protect against failures. Change requests to the patch panel connectivity, e.g., to expand bandwidth capacity or to recover from connection failures, would require local on-site access and manual rewiring. This manual, labor intensive process can stretch across multiple days because of access approval and travel to remote locations, thus leading to long mean-time-to-repair ("MTTR") and network performance degradation.

Optical circuit switching ("OCS") has been one approach to address the above issues. OCS serves as a non-blocking active patch panel that can be controlled remotely and programmed to set up connections between any ports. It is typically implemented through mechanical switching mechanism and direct light beams between different ports either in free space or through physical connections. However, such OCS architectures may have a limited number of ports or may have slow switching speeds.

SUMMARY OF THE INVENTION

Aspects of the invention present a design and implementation of a large-scale non-blocking optical circuit switch using multiple individual OCS modules to address applications for fiber-rich facilities such as datacenters and high-degree backbone POPs. The individual OCS modules may be constructed via either monolithic or multi-chip module ("MCM") techniques.

An optical circuit switching device according to one embodiment comprises a first stage including a first plurality of 2n by 2n optical circuit switching modules, a second stage including a second plurality of 2n by 2n optical circuit switching modules, and a plurality of optical fibers. The second plurality of optical circuit switching modules is fewer than the first plurality of optical circuit switching modules, and the plurality of optical fibers interconnects ports of the first and second pluralities of optical circuit switching modules in a two-stage folded CLOS topology.

In one example, each optical circuit switching module is a non-blocking switching module. In another example, the plurality of optical fibers is fusion spliced to the ports for propagating optical signals between the first and second stages. In a further example, the device also comprises a front plate coupled to the second stage via a second plurality of optical fibers. The front plate is configured to interface with one or more external devices.

In another example, the device further comprises a system control plane operatively coupled to the first stage, the second stage and the front plate. Here, the system control plane is configured to control and monitor overall operation of the optical circuit switching device. In yet another example, each optical circuit switching module of the first stage includes a power monitoring mechanism configured to perform end-to-end power monitoring. In one alternative, none of the optical circuit switching modules of the second stage includes a power monitoring mechanism.

In a further example, the optical circuit switching modules of the first and second stages comprise monolithic MEMS devices. In another example, the first plurality has 2n optical circuit switching modules and the second stage has n optical circuit switching modules. In yet another example, the two-stage folded CLOS topology is oversubscribed. In this case, multiple uplink ports from a given one of the optical circuit switching modules of the first stage may be connected to a selected one of the optical circuit switching modules of the second stage.

And in another example, the optical circuit switching device further comprises a third stage including a third plurality of $2n^2$ optical circuit switching modules. Each module in the third plurality has 2n port switches. In this example, the first stage comprises a plurality of first stages, the second stage comprises a plurality of second stages, the plurality of first and second stages form multiple layers, and the switches of the modules in the third stage interconnect the multiple layers.

In accordance with another embodiment, a method of designing an optical circuit switching device comprises determining a target number of ports in a set of optical circuit switching modules of the optical circuit switching device; identifying an insertion loss distribution across all connections for the set of optical circuit switching modules; performing a fine-grained, automated link budget analysis to ensure that end-to-end, high insertion loss connections are matable to lower insertion loss connections to stay within an end-to-end optical budget; and configuring a multi-stage folded CLOS topology with the set of optical circuit switching modules to minimize overhead given the target number of ports and the insertion loss distribution.

In one example, the method further comprises identifying a scaling requirement for the CLOS topology. If the identified insertion loss distribution and scaling requirement cannot be satisfied simultaneously by a two-stage folded CLOS topology, then in one alternative configuring the topology includes selecting optical circuit switching modules having fewer than the target number of ports. In another example, the set of optical circuit switching modules includes a first group and a second group, and configuring the topology includes selecting only the optical circuit switching modules of the first group to include a power monitoring mechanism.

According to another embodiment, a method for implementing a multi-stage CLOS optical circuit switch architecture comprises choosing a single module having a port count n and a connection insertion loss $\alpha$; determining, with a processing device, whether a scaling requirement for a total number of ports) is satisfied; determining, with the processing device, whether an insertion loss requirement is satisfied; and when both the scaling requirement and insertion loss requirement are satisfied, configuring a two-stage CLOS optical circuit switch architecture according to the port count n and the connection insertion loss $\alpha$.

If the scaling requirement is satisfied and the insertion loss requirement is not satisfied, then according to one example the method further comprises modifying the port count to be m, where m is less than or equal to n; and modifying the insertion loss to be $\beta$, where $\beta$ is less than $\alpha$. if the scaling requirement is not satisfied, then according to another example the method further comprises configuring a three-stage CLOS design. Here, in one alternative, the method further comprises modifying the port count to be m, where m is greater than n.

Alternatively, if the scaling requirement is satisfied and the insertion loss requirement is not satisfied, the method further comprises modifying the port count to be m, where m is less than or equal to n, and modifying the insertion loss to be $\beta$, where $\beta$ is less than $\alpha$.

DETAILED DESCRIPTION

The aspects, features and advantages of the present invention will be appreciated when considered with reference to the following description of embodiments and accompanying figures. The same reference numbers in different drawings may identify the same or similar elements. Furthermore, the following description does not limit the present invention; rather, the scope of the invention is defined by the appended claims and equivalents.

One approach to implementing a large-scale non-blocking switch from available low radix non-blocking switches is the CLOS topology. CLOS networks are used to construct a larger-scale switch when the switching-port needs exceed the radix of the largest available single switch. Historically, the CLOS topology approach has been applied to electrical switching environments for real-time and interactive data delivery, as it was originally designed to solve capacity constraints in telephone switching networks. The CLOS topology has since been applied to electronic packet switching environments for real-time and interactive data delivery among multiple integrated circuit (IC) chips.

Figure 1:
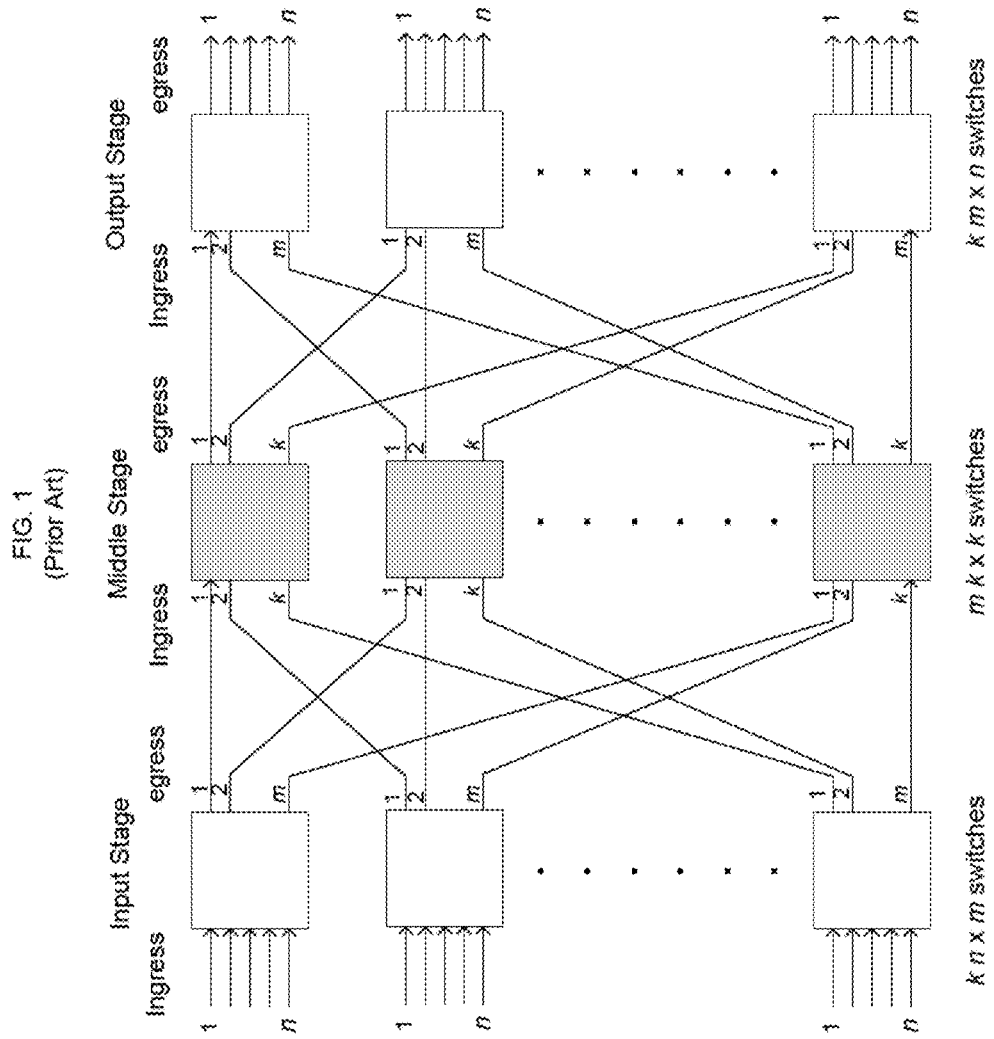
FIG. 1 illustrates a CLOS network for use with embodiments of the invention.

A CLOS network is a multistage switching network first conceived by Charles Clos in 1953, representing a theoretical idealization of practical multi-stage telephone switching systems. FIG. 1 illustrates a CLOS network topology for use with aspects of the invention. The input stage consists of k switches with n ingress ports and m egress ports (an n×m switch). The middle stage consists of m k×k switches. And the output stage consists of k m×n switches.

Figure 2:
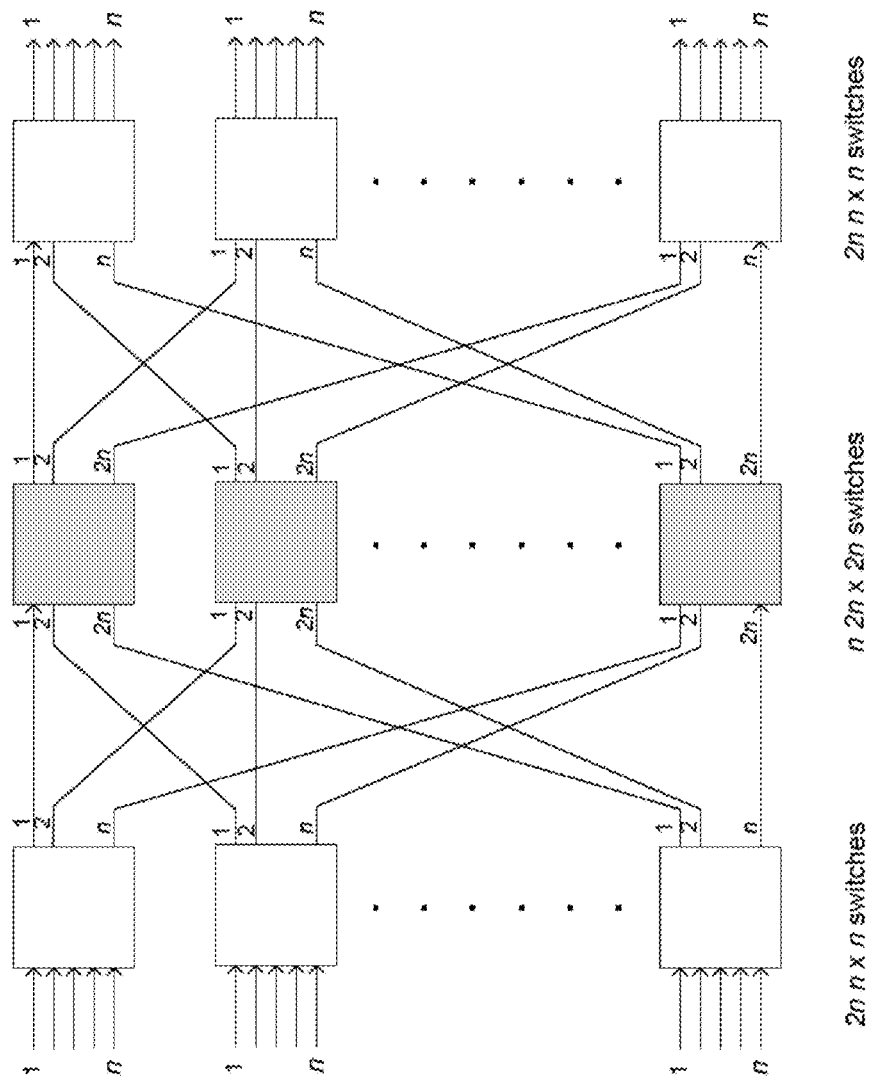
FIG. 2 illustrates a non-blocking CLOS network for use with embodiments of the invention.

FIG. 2 illustrates a special case, where m=n and k=2n. In this case, the CLOS network is strictly non-blocking if each individual switch is non-blocking, which means that an unused ingress port on the left can always find a free path to an unused egress port on the right without having to re-arrange any of the existing connections.

Figure 3A:
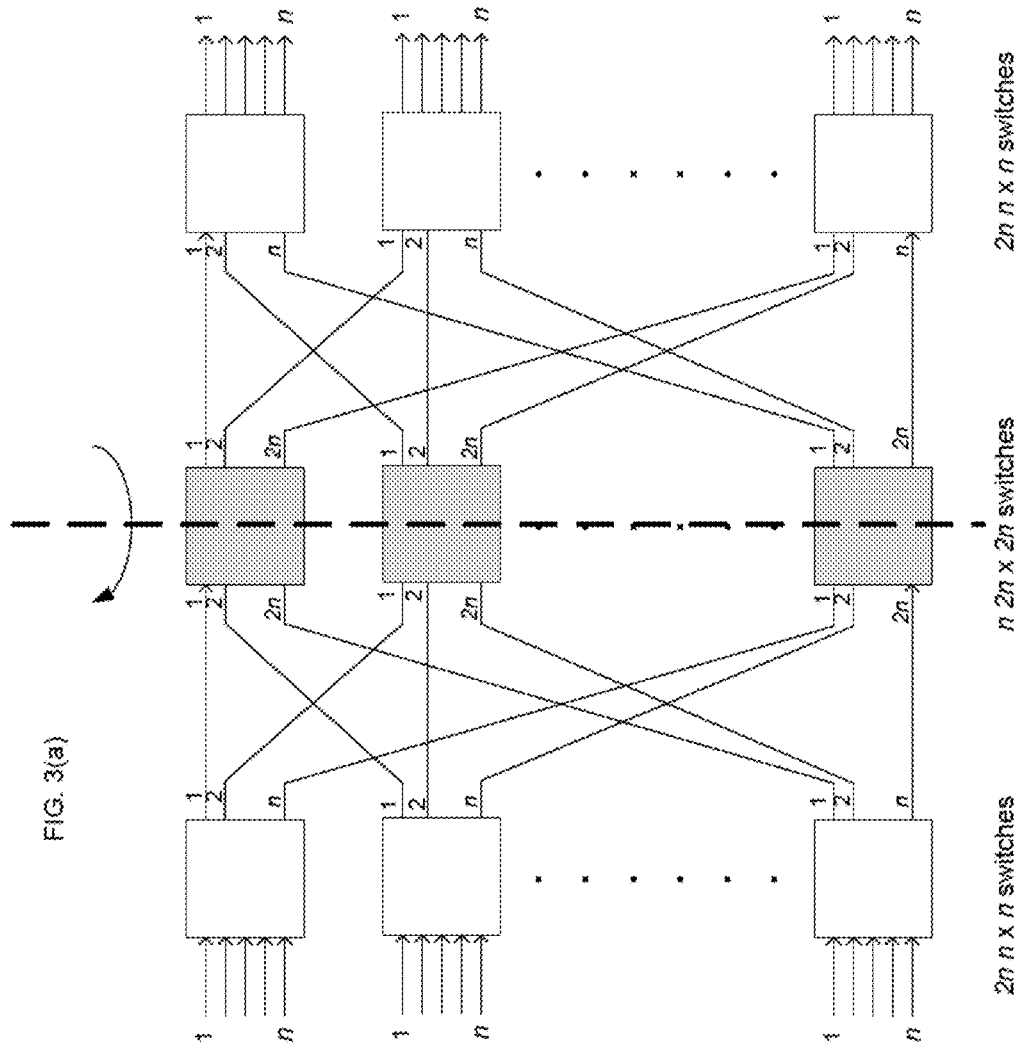
FIGS. 3(a)-(c) illustrate development of a CLOS-type topology for use with aspects of the invention.
Figure 3B:
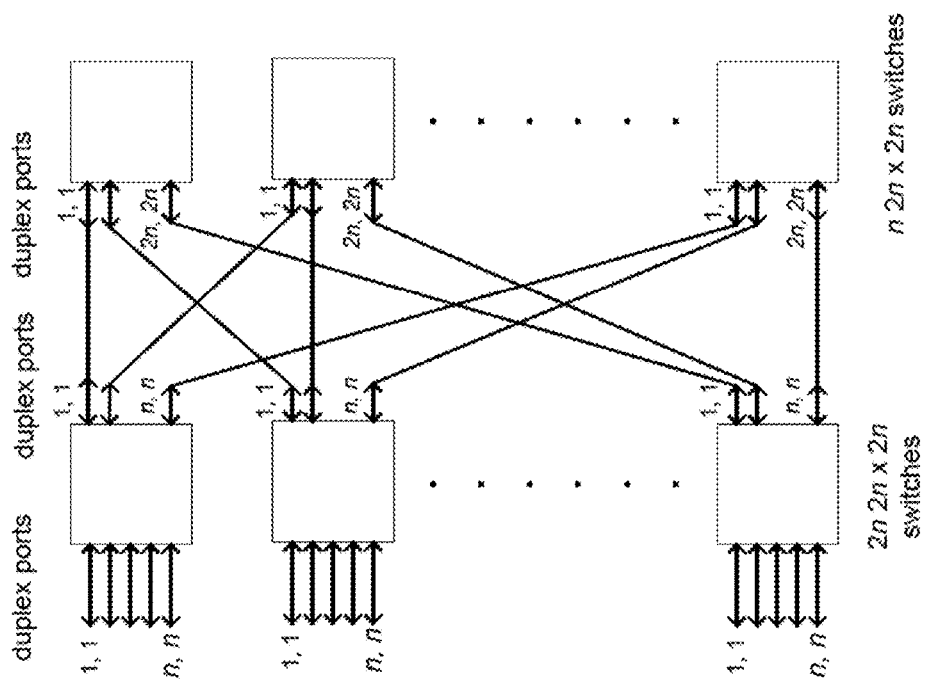
Figure 3C:
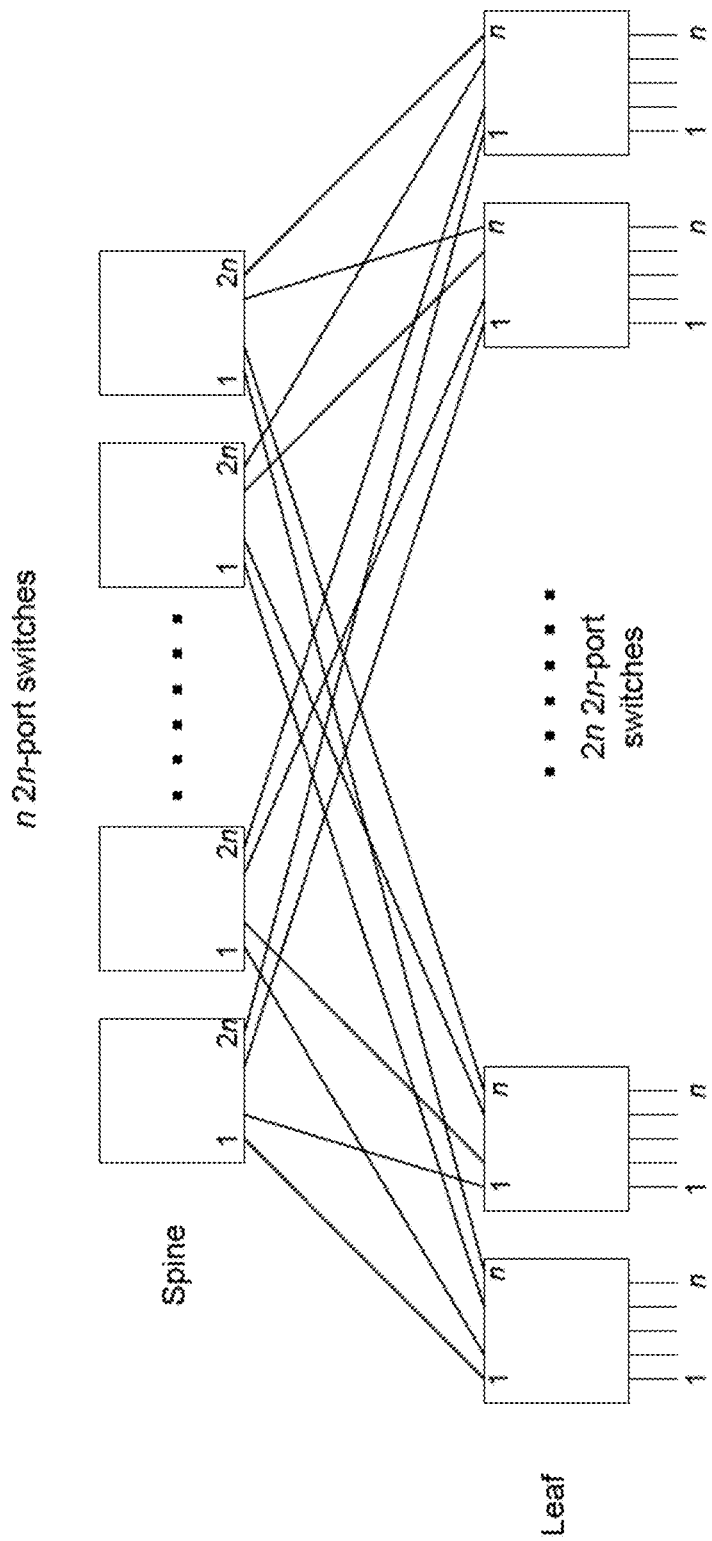

The CLOS topology may be modified by folding the flat two-dimensional structure along the center of the middle stage. In this case, every ingress port has a matched egress port due to the symmetry of the topology, which is shown in FIGS. 3(a) and (b). Here, m=n and k=2n, and all switches become identical with 2n duplex ports. Each pair of matched ingresses and egresses may be referred to as a duplex port. As used herein, the term "port" refers to a duplex port unless otherwise stated. By turning the topology 90 degrees, it becomes a 2-stage folded CLOS or "FAT TREE" network as shown in FIG. 3(c). The result is a 2-stage folded CLOS topology built with identical 2n-port switches to its maximum scale. The top stage is referred to as "spine" switches, and the bottom stage is referred to as "leaf" switches.

Figure 4:
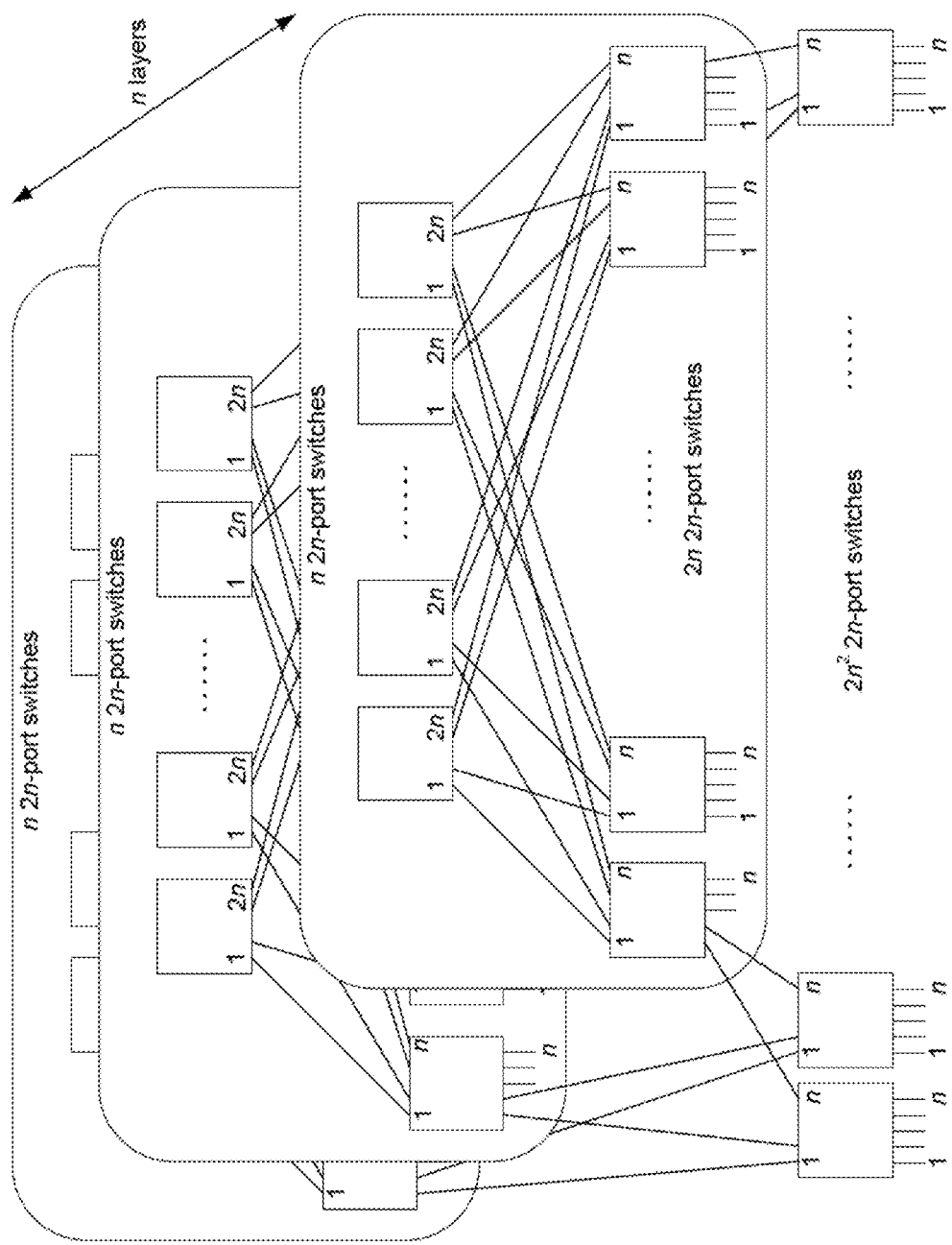
FIG. 4 illustrates a 3-stage CLOS topology in accordance with aspects of the invention.

The 2-stage folded architecture of FIG. 3(c) has several advantages over the original CLOS topology. For example, it constructs a large-scale non-blocking topology by using switching elements of the same type, such as identical switching elements. In this case, each switch has 2n ports (it is a 2n×2n non-blocking switch). In addition, the total number of stages and total number of switches are reduced. Furthermore, it is easier to scale up even further from a 2-stage folded CLOS to a 3-stage folded CLOS. FIG. 4 shows an example of a 3-stage CLOS topology deploying 2n-port switches. As shown, the 2-stage topology is first repeated n times, and then $2n^2$ third stage leaf switches are added to interconnect these n layers of 2-stage networks.

The ultimate scaling limit of a 2-stage folded CLOS using 2n-port switches is $2n^2$ ports, if a complete fan-out from any one of the n uplink ports of a leaf switch is connected to a unique spine switch. A smaller scale and oversubscribed topology may be realized by connecting m (where m<n) uplink ports from one leaf switch to the same spine switch. Here, the total number of spine switches becomes n/m and there is an oversubscription ratio of m:n. Therefore, the total number of ports of the CLOS topology becomes $2n^2/m$ ports. Similarly, for a 3-stage example as shown in FIG. 4, the maximum port count is $2n^3$.

However, it is recognized that there are a large number of ports that are used only for internal wiring among switches in different stages. The ratio between external ports and total ports may be used as a parameter to measure how effective and efficient the topology is in terms of cost per external port. For instance, in a 2-stage design, $2n^2/6n^2=\frac{1}{3}$ of the total ports are external user facing ports, resulting in 67% overhead of ports for internal wiring. And in a 3-stage design, $2n^3/10n^3=\frac{1}{5}$ of the total ports are externally useful ports, with 80% of wasted ports used for internal wiring only. Therefore, moving up with more stages, although increasing the scale of CLOS topology, would increase the per-port cost of the CLOS topology.

Conventional single-module optical circuit switches are typically based on one of several general technologies. The most common is the micro-electromechanical system ("MEMS") technology, in which arrays of 2-dimensional silicon mirrors are used to steer optical beams in free space between different ports. Another approach uses piezoelectric actuators to steer optical beams in free space between different ports. A third technique is based on a dynamic multi-layer optical coupling technology that leverages high-precision motors driving two sets of fibers to couple the light through matched ports. All three technologies have scaling limits in terms of port count. MEMS based technology is limited by the silicon chip yield and optical coupling loss of the collimating lens. Piezoelectric technology is limited by the small switching angle and physical space. High-precision motor based technology is limited by the physical space consumed by the dynamic multi-layer optical coupling design, and it also requires orders of magnitude longer switching time to set up a physical connection.

As discussed above, a 2-stage folded CLOS topology can be an effective approach to scale up the port count. In this section, design and implementation details are provided for applying this topology in the optical domain to come up with a viable large-scale OCS solution. This includes an interconnectivity topology to address internal wiring overhead, fiber management and connectivity issues at large scale, optical insertion loss and power budget for link design, insertion loss and scaling optimization strategies, and built-in power monitoring schemes to manage end-to-end connectivity.

In order to obtain a large-scale non-blocking OCS, one aspect of the invention leverages existing small-radix OCS modules to construct a multi-stage folded CLOS with a shared electrical control plane. To meet the datacenter scaling requirement while maintaining reasonable per-port cost at the same time without too much internal wiring overhead, a 2-stage topology may be employed using a single OCS with relatively large port count. Individual OCS modules are not limited to a particular technology as long as the system meets the port count requirement and can be packaged into a footprint of a single chassis or a single rack for further scaling. However, this does not rule out the possibility of building a topology with more than two stages to scale up further to meet a range of application requirements.

According to one embodiment, each OCS module includes fiber attached to each simplex port. The ports used for internal connectivity between the leaf and spine switch modules in two stages may be connected through a low-loss method such as fusion splicing. These internal connections may also be realized by terminating all fibers with matched connectors. However, there are several advantages of fusion splicing over the matched connector approach. First, fusion splicing incurs a very small optical loss. Second, it typically has a lower cost since no connectors and mating couplers are needed. And third, because the internal wiring pattern is fixed once the scale of the CLOS network is determined, fusion splicing on large amount of fibers can be done automatically with a computer-aided process instead of a costly labor-intensive manual process with frequent human errors. On the other hand, the external user-facing ports may be terminated with fiber connectors to be mounted on the front plate. For a large scale design, high-density fiber terminations such as (but not limited to) MTP (Mechanical transfer push on) or MPO (multi-fiber push on)-type connectors, may be used, as shown in the 2-stage folded CLOS OCS architecture 500 of FIG. 5.

Here, the spine stage includes n $2n \times 2n$ OCS modules 502. The leaf stage includes 2n $2n \times 2n$ OCS modules 504. The OCS modules 502 and 504 are interconnected using optical fibers, where each line 506 represents two fibers for a duplex port. The leaf OCS modules 504 are connected to a front plate 508, which includes high density fiber connectors 510 for interconnection to other devices (not shown). System control plane 512 connects all modules and controls the overall operation of the entire system. The system control plane 512 may be composed of off-the-shelf IC chips such as a microprocessor, memory, auxiliary communications ports, etc. and may follow standard digital system design to realize the desired control functions.

One exemplary embodiment of this architecture employs monolithic MEMS-based optical circuit switches with good port counts of sufficient size to construct the 2-stage folded CLOS. The maximum port counts per MEMS OCS module is often limited by the yield of MEMS silicon and scale of OCS module packaging. In such a configuration, each MEMS OCS module has fiber connections 506 to all ports of all other OCS modules. The ports used for propagating a signal from the first stage to the second stage may be physically connected using a very low loss method, e.g., fusion splicing, while the ports facing end users may be terminated with the high-density fiber connectors 510.

Figure 5:
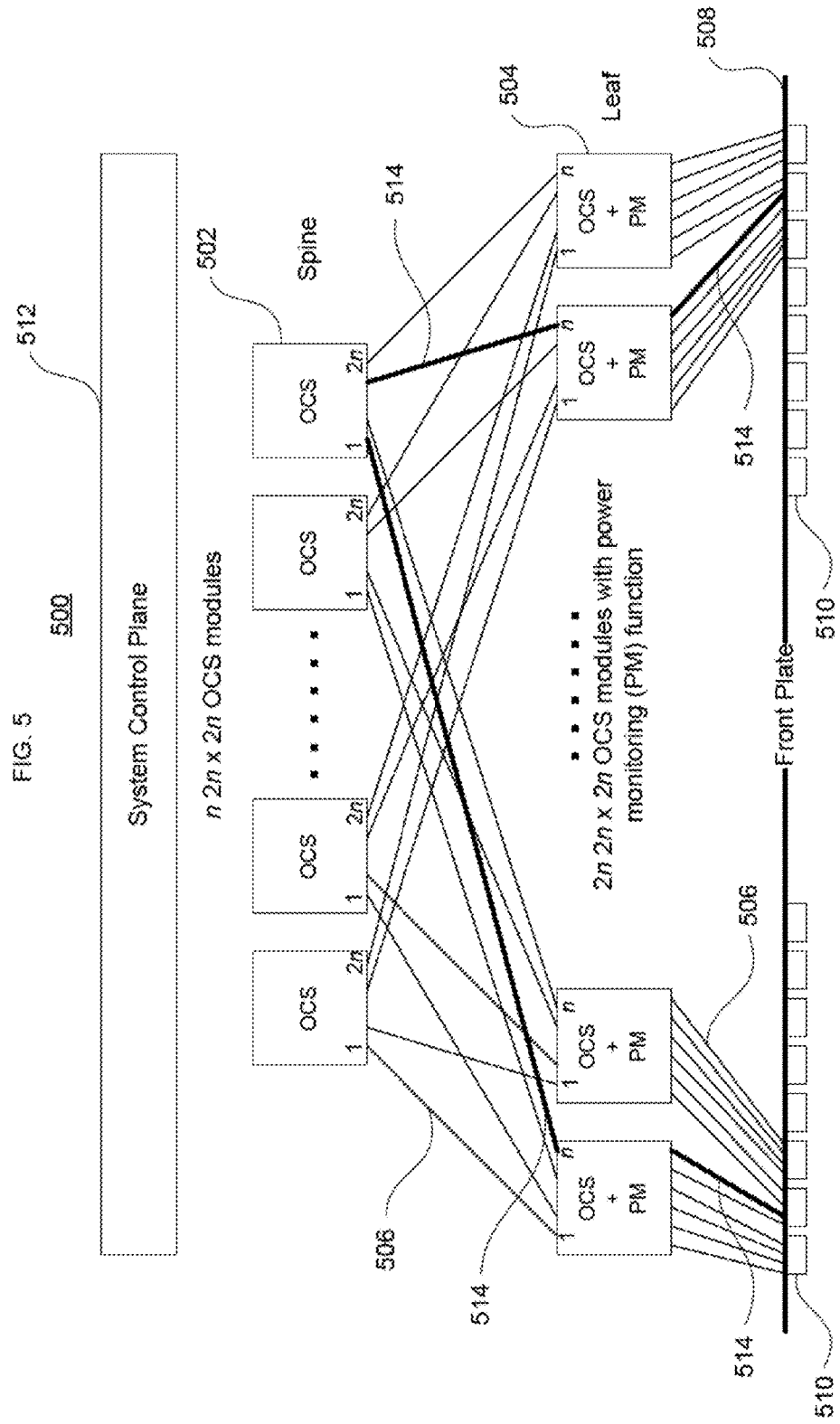
FIG. 5 illustrates a 2-stage folded CLOS optical circuit switch in accordance with aspects of the invention.

Unlike electrical packet switching in which optical-electrical-optical ("O-E-O") conversion occurs at each switch interface, optical circuit switching is straight cut-through with native optical propagation along the entire path. Therefore, it is important to minimize the optical insertion loss going through each OCS so that cost-effective optical transceivers with limited optical power budget can be used to drive network links. The worst case optical switching path from any port to any port is through three different switches (two leaf switches and one spine switch) as indicated in FIG. 5 by thick lines 514 as an example. Therefore, the maximum insertion loss for a 2-stage folded CLOS OCS is three times of the maximum insertion loss of an individual OCS plus fusion splicing loss. OCS technologies that involve free-space optics usually would result in higher insertion loss with increasing port count because of beam divergence associated with longer optical paths. However, a higher port count (n) per OCS module leads to larger scaling limit in a 2-stage topology (following $2n^2$).

When insertion loss and scaling requirement cannot be satisfied simultaneously by a 2-stage design, an alternative approach would to deploy OCS modules with smaller port counts but with a lower maximum insertion loss per stage to build higher order CLOS topology, such as three stages or more, to meet the scaling requirement. Using more stages, the overall insertion loss may still be lower as long as the insertion loss reduction per module with smaller port count surpasses the worse-case hop increment due to more stages. In addition, as long as the OCS module port count used in a 3-stage is, for example, greater than $x^3$ (where x is the port count reduction ratio compared to the module used in a 2-stage) the total scale of a 3-stage topology is greater than a 2-stage topology. Therefore, a good design decision should be made by carefully optimizing the insertion loss per module, number of ports per module, number of stages and the total scale required.

An interesting property of OCS modules is that the insertion loss varies with the free-space path between the input port and the output port following a certain statistical distribution. The worst-case insertion loss must be reported for the specification, although the typical insertion loss value may be substantially lower. Hence, manufacturers need to carefully balance the specification with yield, cost and the maximum number of ports. Currently, this tradeoff is typically made assuming a single-stage deployment.

To enable scaling to multi-stage scenarios with a stringent optical link budget requirement, one aspect of the invention employs the following strategy to work with commodity OCS modules designed for single-stage use. If a target number of ports in a deployment is known, one can come up with different solutions of different CLOS stages built with OCS modules having different port counts. Once the insertion loss distribution across all ports of the available OCS modules is known, one can decide on a solution by choosing the maximum number of ports from an individual module capable of supporting an end-to-end insertion loss across the multi-stage topology while still achieving the scaling target. For example, the final test data for insertion loss available for each of the n×n connections may be made available via the switch command API. This allows the network management software to be aware of insertion loss variations within each switch.

Consider a simple scenario involving a 10,000-port switch with an end-to-end optical link budget of 6 dB (not including the internal wiring loss), having a worst-case insertion loss for a given 320-port OCS module of 3 dB. This would preclude deploying this 320-port module in a 2-stage CLOS topology with all random internal connections because the worst-case path would follow 3 hops with a worst-case total insertion loss of 9 dB. However, if one could select only 160 ports in the module with an insertion loss of less than 2 dB, a 2-stage CLOS may still be built while satisfying the end-to-end link budget requirements in this scenario. Note that this involves a tradeoff eliminating 50% of the ports with higher loss to enable a 2-stage design capable of scaling up to 160× 80=12,800 ports, a significant capability beyond the reach of the original 320-port modules.

Figure 6:
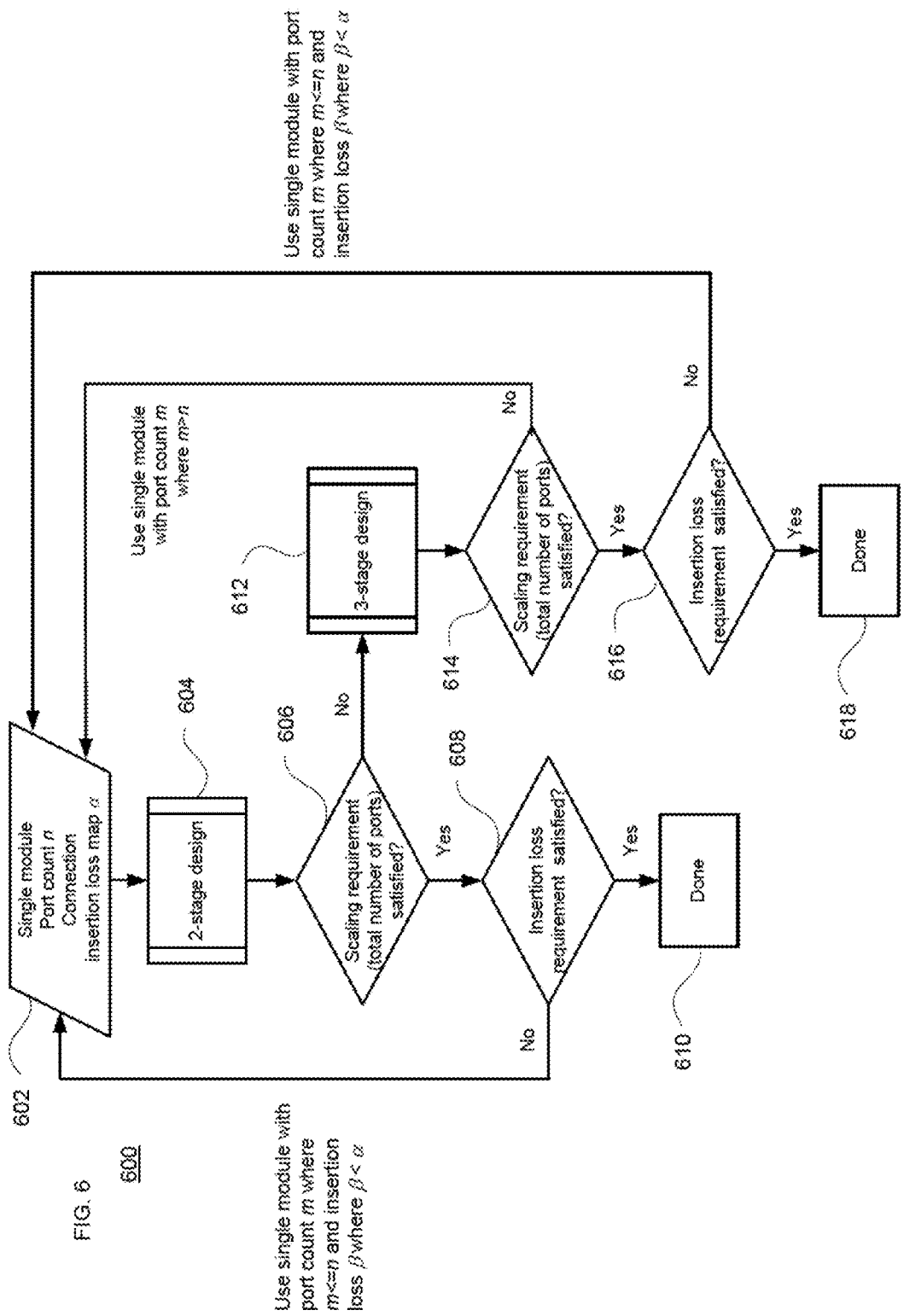
FIG. 6 illustrates a process for implementing a multi-stage CLOS optical circuit switch.

FIG. 6 illustrates a process 600 for implementing a multi-stage CLOS optical circuit switch according to one aspect of the disclosure. As shown, the design may begin at block 602 with a single module having a port count n and a connection insertion loss α. At block 604, the two-stage design is begun. It is determined at block 606 whether the scaling requirement (e.g., the total number of ports) is satisfied. If the scaling requirement is satisfied, the process proceeds to block 608, where it is determined whether the insertion loss requirement is satisfied. If this condition is true, then the process ends at block 610. If the insertion loss condition is not true, then the process returns to block 602, while modifying the port count to be m, where m is less than or equal to n, and modifying the insertion loss to be β, where β is less than α.

If the scaling requirement in block 606 is not satisfied, then the process proceeds to block 612 for a three-stage design. At block 614 it is determined whether the scaling requirement (e.g., the total number of ports) is satisfied. If the scaling requirement is satisfied, the process proceeds to block 616, where it is determined whether the insertion loss requirement is satisfied. If the insertion loss condition is true, then the process ends at block 618. If this condition is not true, then the process returns to block 602, while modifying the port count to be m, where m is less than or equal to n, and modifying the insertion loss to be β, where β is less than α. If the scaling requirement condition in block 614 is not satisfied, then the process returns to block 602 to start with a single module having port count m, but where m is greater than n.

To address port to port reliability concerns, a power monitoring mechanism may be employed for fault detection and protection. Power monitoring may be included on each switching module in one example; however, in another example, instead of adding power monitoring on every switch module, it is sufficient to have power monitoring on leaf switches only, to perform end-to-end monitoring to minimize total optical insertion loss and system cost. The power monitoring may be done using a waveguide coupler or splitter to tap a smaller percentage of optical power.

As discussed above, instead of constructing a flat 2-dimensional CLOS network, one aspect of the invention employs a folded CLOS architecture because of its ease of implementation. This enables the topology to scale arbitrarily with increasing number of stages. However, the fraction of ports that must be allocated for internal switch wiring (overhead) also goes up with the number of stages. For example, a 2-stage design makes ⅓ of the total ports available as user facing ports, with the remaining ⅔ making up overhead in the form of internal switch wiring. The amount of overhead for a 3-stage CLOS topology goes up to 80%. Higher overhead of course results in higher overall cost for a CLOS topology. Hence, a particular network design should employ only as many stages as necessary to achieve its scaling target.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:
1. An optical circuit switching device, comprising:
a first stage including a first plurality of 2n by 2n optical circuit switching modules;
a second stage including a second plurality of 2n by 2n optical circuit switching modules, the second plurality of optical circuit switching modules being fewer than the first plurality of optical circuit switching modules;
a first plurality of optical fibers interconnecting ports of the first and second pluralities of optical circuit switching modules in a two-stage folded CLOS topology, wherein the plurality of optical fibers is fusion spliced to the ports for propagating optical signals between the first and second stages;
a front plate coupled to the first stage via a second plurality of optical fibers, the front plate being configured to interface with one or more external devices;
wherein each optical circuit switching module of the first stage includes a power monitoring mechanism configured to perform end-to-end power monitoring across at least one optical circuit switching module of the first stage and at least one optical circuit switching module of the second stage; and
wherein none of the optical circuit switching modules of the second stage includes a power monitoring mechanism.

2. The optical circuit switching device of claim 1, wherein each optical circuit switching module is a non-blocking switching module.

3. The optical circuit switching device of claim 1, further comprising a system control plane operatively coupled to the first stage, the second stage and the front plate, the system control plane being configured to control and monitor overall operation of the optical circuit switching device.

4. The optical circuit switching device of claim 1, wherein the optical circuit switching modules of the first and second stages comprise monolithic MEMS devices.

5. The optical circuit switching device of claim 1, wherein the first plurality has 2n optical circuit switching modules and the second stage has n optical circuit switching modules.

6. The optical circuit switching device of claim 1, wherein the two-stage folded CLOS topology is oversubscribed.

7. The optical circuit switching device of claim 6, wherein multiple uplink ports from a given one of the optical circuit switching modules of the first stage are connected to a selected one of the optical circuit switching modules of the second stage.

8. The optical circuit switching device of claim 1, wherein an optical insertion loss of each optical circuit switching module in the second stage is minimized by not including the power monitoring mechanism.

9. An optical circuit switching device, comprising:
- a first stage including a first plurality of 2n by 2n optical circuit switching modules;
- a second stage including a second plurality of 2n by 2n optical circuit switching modules, the second plurality of optical circuit switching modules being fewer than the first plurality of optical circuit switching modules;
- a third stage including a third plurality of $2n^2$ optical circuit switching modules, each module in the third plurality having 2n ports; and
- a plurality of optical fibers interconnecting ports of the first and second pluralities of optical circuit switching modules in a two-stage folded CLOS topology;
- wherein each optical circuit switching module of the first stage includes a power monitoring mechanism configured to perform end-to-end power monitoring across at least one optical circuit switching module of the first stage and at least one optical circuit switching module of the second stage.

10. The optical circuit switching device of claim 9, further comprising:
- a plurality of first stages; and
- a plurality of second stages;
- wherein the plurality of first and second stages form multiple layers; and
- wherein the modules in the third stage interconnect the multiple layers.

11. An optical circuit switching device, comprising:
- a first stage including a first plurality of 2n by 2n optical circuit switching modules;
- a second stage including a second plurality of 2n by 2n optical circuit switching modules, the second plurality of optical circuit switching modules being fewer than the first plurality of optical circuit switching modules;
- a plurality of optical fibers interconnecting ports of the first and second pluralities of optical circuit switching modules in a two-stage folded CLOS topology; and
- at least one power monitoring mechanism configured to perform end-to-end power monitoring across at least one optical circuit switching module of the first stage and at least one optical circuit switching module of the second stage, the at least one power monitoring mechanism included only on each of the first stage optical-circuit switching modules.

* * * * *